United States Patent [19]
Adachi et al.

[11] Patent Number: 5,853,869
[45] Date of Patent: Dec. 29, 1998

[54] TRANSPARENT CONDUCTOR FILM FOR ELECTRIC FIELD SHIELDING

[75] Inventors: Kenji Adachi, Chiba; Atsushi Yamanaka; Atsushi Toufuku, both of Ichikawa City; Sadahiro Iida, Narashino City; Masaya Yukinobu, Niihama City; Keiichi Orita, Oyama City; Hiroko Inage, Inzai-machi; Hiromitsu Takeda, Ichikawa City, all of Japan

[73] Assignees: Sumitomo Metal Mining Co., Ltd.; Tohoku Chemical Industries, Ltd., both of Tokyo, Japan

[21] Appl. No.: 892,155

[22] Filed: Jul. 14, 1997

Related U.S. Application Data

[63] Continuation-in-part of Ser. No. 518,468, Aug. 23, 1995, abandoned.

[51] Int. Cl.$^6$ ..................................................... B32B 18/00
[52] U.S. Cl. .......................... 428/325; 428/331; 428/428; 428/432; 428/446
[58] Field of Search ................................ 313/477 R, 479, 313/480, 489, 635; 428/402, 403, 404, 405, 428, 432, 446, 448, 325, 331

[56] References Cited

U.S. PATENT DOCUMENTS

| | | | |
|---|---|---|---|
| 4,945,282 | 7/1990 | Kawamura | 313/479 |
| 5,189,337 | 2/1993 | Endo | 313/479 |
| 5,396,148 | 3/1995 | Endo | 313/479 |
| 5,412,278 | 5/1995 | Iwasaki | 313/478 |

FOREIGN PATENT DOCUMENTS

| | | |
|---|---|---|
| 55-162428 | 12/1980 | Japan . |
| 60-59250 | 12/1985 | Japan . |
| 63-193971 | 8/1988 | Japan . |
| 01211830 | 8/1989 | Japan . |
| 0268841 | 3/1990 | Japan . |
| 242548 | 9/1990 | Japan . |
| 03122950 | 5/1991 | Japan . |
| 05132341 | 5/1993 | Japan . |
| 05166423 | 7/1993 | Japan . |
| 588875 | 12/1993 | Japan . |
| 0687631 | 3/1994 | Japan . |

*Primary Examiner*—Timothy M. Speer
*Attorney, Agent, or Firm*—Watson Cole Grindle Watson, P.L.L.C.

[57] ABSTRACT

A thin conductive film which excels in film strength, weather resistance, transparency, and electric field shielding effect is formed on a glass substrate at a low temperature as a multilayer film which is formed of an ITO-dispersed silicate layer and an overcoat silicate layer, or at least two layers of an ITO dispersed silicate and a high-conductivity oxide-dispersed silicate, and a topmost layer of an overcoat silicate. The ITO dispersed silicate layer includes ultra fine particles of indium tin oxide and a silicate-based glass matrix, and the high-conductivity oxide-dispersed silicate layer consists of includes ultra fine particles selected from the group of ruthenium dioxide, rhenium trioxide, iridium dioxide, rhodium dioxide and irridium-based pyrochlore and a silicate-based glass matrix.

9 Claims, No Drawings

TRANSPARENT CONDUCTOR FILM FOR ELECTRIC FIELD SHIELDING

CROSS-REFERENCE TO RELATED APPLICATION

This application is a continuation-in-part of application Ser. No. 08/518,468, filed Aug. 23, 1995, now abandoned.

BACKGROUND OF THE INVENTION

1. Field of the Invention

The present invention relates to a transparent conductor film for providing an electric field-shielding effect to the front glass of a cathode ray tube such as the display of office automation equipment and the CRT of a television.

2. Description of the Prior Art

Due to recent office automation, many office machines have been introduced to offices, and employees often work an entire day in front of the displays of such machines. When work is done in front of the cathode ray tube (CRT) of a computer, it is required not only that the display screen be easy to see and not cause visual fatigue but also that contamination of, and electric shock from, the surface of the CRT due to electric charge be minimized. In addition, adverse effects from low-frequency electromagnetic waves from the CRT on human bodies have been reported, and CRTs which do not leak electromagnetic waves are now in demand.

Electromagnetic waves generate from deflecting coils or fly-back transformers, and as the size of television sets increases, intense electromagnetic waves increasingly tend to leak to the surroundings. Most leakage of magnetic fields can be prevented by measures such as changing the shape of the deflecting coils. On the other hand, the leakage of electric fields may be prevented by the formation of a conductive transparent film on the surface of the front glass of the CRT. These methods are in principle the same as the countermeasures recently taken for preventing electrostatic charge. In these cases, however, the conductivity of the conductive film is required to be much higher than the conductivity of the conductive film formed for preventing electrostatic charge. Although the surface resistance of the film for preventing electrostatic charge is about $10^8$ $\Omega/cm^2$, a transparent film of resistance as low as $10^6$ $\Omega/cm^2$ or below, preferably $10^3$ $\Omega/cm^2$, must be formed for preventing leakage of electric fields.

In order to meet the above requirements, a number of methods have been proposed. In one of the methods, for example, a film of a conductive oxide such as tin oxide and indium oxide is formed on the front surface of a CRT by vacuum evaporation or CVD. Since the film formed using these methods is made of a single composition such as tin oxide or indium oxide, the conductivity of the material is directly reflected to sufficiently low resistance for electric field shielding effects. Also, the film thickness is easily controlled to be sufficiently thin and uniform, and reflection-preventing treatment is easily made without affecting the resolution of the CRT.

Furthermore, although a temperature of 200° C. is practically required in order to treat the front surface of a CRT while maintaining the high vacuum in the CRT, no problems arise in vacuum evaporation and CVD. By these methods, however, since the atmosphere must be controlled for each CRT to be treated, and high costs are involved, these are not practical methods. Therefore, these methods have not been used except for CRTs special purposes. Inexpensive and rapid methods for film forming are in demand.

As a practical and inexpensive coating method for imparting conductivity, JPUPA 1-299877 discloses a method of spraying or applying an ink composition containing conductive fine particles. In this method, fine particles of tin oxide, silica sol and an organic solvent are used as the ink, and a film is formed by using the condensation polymerization reaction of silica sol which can react at a temperature as low as 200° C. or below. Using this method, however, since a film is formed in which fine particles of tin oxide are dispersed in the matrix of silicate, conductivity is about $10^3$ lower than the conductivity of the CVD film of the above single continuous film of tin oxide. That is, the surface resistance of the transparent conductive film formed using the above mixed solution, of a thickness not impairing the brightness of the CRT screen and resolution, is at least $10^7$ $\Omega/cm^2$, which does not satisfy the required conductivity for leakage electric field shielding.

The present invention was devised considering such conditions in the prior art, and it is an object of the present invention to provide a transparent conductive film for electric field shielding which is formed at a low temperature and has a thin thickness and a low surface resistance sufficient for electric field shielding for CRTS.

BRIEF SUMMARY OF THE INVENTION

The transparent conducting film for electric field shielding according to the present invention is formed on a glass substrate, and consists of an ITO dispersed silicate layer and a transparent silicate glass layer. The film may also be a transparent conductive film for electric field shielding comprising a laminate having three or more layers formed on a glass substrate, at least two of which consist of an ITO dispersed silicate layer and a high-conductivity oxide dispersed silicate layer, and the topmost layer is an overcoat silicate layer.

Here, the ITO dispersed silicate layer essentially consists of (A)+(B) or (A)+(B)+(C), where (A) is ITO particles, (B) is a silicate-based glass matrix, and (C) is fine particles of a high-conductivity oxide. (A) ITO particles contain 50 percent by particle volume of particles having a diameter of 50 nm or less, and the percentage volume of the ITO particle for the volume of the film is 35–76 percent. (C) Fine particles of a high-conductivity oxide consist of one or more selected from a group of ruthenium dioxide ($RuO_2$), rhenium trioxide ($ReO_3$), iridium dioxide ($IrO_2$), rhodium dioxide ($RhO_2$), ruthenium-based pyrochlore ($Pb_2Ru_2O_{6.5}$, $Bi_2RU_2O_{7-x}$), and iridium-based pyrochlore($Pb_2Ir_2O_{7-x}$, $Bi_2Ir_2O_7$), and the content of the fine particles of a high-conductivity oxide is less than 25 percent by weight of ITO, preferably between 0.1 and 25% by weight.

The high-conductivity oxide dispersed silicate layer consists essentially of (B)+(C) or (B)+(C)+(D), where (B) is a silicate-based glass matrix, (C) is fine particles of a high-conductivity oxide, and (D) is fine particles of a transparent conductive oxide. (C) Fine particles of a high-conductivity oxide consist of one or more selected from a group of ruthenium dioxide ($RuO_2$), rhenium trioxide ($ReO_3$), iridium dioxide ($IrO_2$), rhodium dioxide ($RhO_2$), ruthenium-based pyrochlore ($Pb_2RU_2O_{6.5}$, $Bi_2Ru_2O_{7-x}$), and iridium-based pyrochlore($Pb_2Ir_2O_{7-x}$, $Bi_2Ir_2O_7$).

Furthermore, when the above ITO dispersed silicate layer is composed by laminating (A) ITO particles, (C) fine particles of a high-conductivity oxide, and (B) silicate-based glass matrix in this order, the first layer is composed of a layer in which (C) fine particles of a high-conductivity oxide are dispersed in (A) ITO particles.

Fine particles of rhenium trioxide introduced as fine particles of a high-conductivity oxide can be those formed in the film during heating by the reduction of a heptavalent rhenium compound.

Further, the transparent conductive film for electric field shielding may consist of a single layer of high-conductivity oxide dispersed silicate, or a double layer of a high-conductivity oxide dispersed silicate layer and a transparent silicate glass layer, formed on a glass substrate.

Specifically, the transparent conductive films for electric field shielding of the present invention include, for example, a double layer film consisting of a substrate-ITO dispersed silicate layer-overcoat silicate film laminate, a triple layer film consisting of a substrate-ITO dispersed silicate layer-$ReO_3$ dispersed silicate layer-overcoat silicate film laminate, a triple layer film consisting of a substrate-[$ReO_3$+$RuO_3$] dispersed silicate layer-ITO dispersed silicate layer-overcoat silicate film laminate, and quadruple layer film consisting of a substrate-$RuO_2$ dispersed silicate layer-silicate layer-ITO dispersed silicate layer-overcoat silicate film laminate, and any number of layers may be used if the number is three or more. The important aspect is that the conductive layer in which fine ITO particles are dispersed, and coated with an overcoat film is a double layer, and in a multilayer structure, a silicate layer in which fine particles of high-conductivity oxides such as $ReO_3$ and $RuO_2$ are dispersed is introduced as the parallel constituent of the coating film using ITO. By the introduction of this layer, the entire surface resistance of the multilayer film lowers significantly.

In the present invention, the reason why an overcoat silicate film is formed on the topmost layer is to reinforce the film and to impart a low reflecting effect. Since the index of refraction of the ITO dispersed silicate film and the high-conductivity oxide dispersed silicate film is higher than the index of refraction of the substrate, the face panel of the CRT, coating the surface of the ITO film with a film with a low index of refraction such as a silicate film will lower the index of refraction due to destructive interference between reflected waves from the first layer and reflected waves from the second layer depending on controlled indices of refraction and film thickness, thus a CRT with less glare due to reflection and with an easy-to-see screen is produced. With an increase in the number of layers having large and small indices of refraction arranged alternately, the low reflection effect is generally improved. Although the main object of providing an overcoat is the protection of underlying layers, if a multilayer film with a low reflection effect is designed, a CRT with a high added value in addition to the electric field shielding effect is produced at low costs, resulting in an invention of high industrial value.

In the ITO dispersed silicate layer constituting the transparent conductive film for electric field shielding of the present invention, ultra fine particles of ITO are used as conductive particles dispersed in the film. In this case, conductive paths where fine particles contact with each other in the film impart conductivity to the film. Since fine ITO particles have a specific resistance more than ten times lower than fine tin oxide particles, the ITO dispersed film has a much lower resistance than a tin oxide dispersed film. In order to form a conductive film having a conductivity of $10^6$ $\Omega/cm^2$ or below required for shielding electric field, the percentage volume of fine ITO particles for the volume of the film must be in the range between 35 and 76 percent, although it depends on the degree of dispersion. Sufficient conductivity is not achieved when the film thickness is 0.07 $\mu$m or less.

Since the average primary particle diameter of fine ITO particles normally available exceeds 50 nm, coagulated secondary particles with particle diameter exceeding 50 nm increase, and even if resistance decreases, required optical properties cannot be obtained. In the present invention, therefore, the condition where fine ITO particles of a particle diameter of 50 nm or less occupy 50 percent or more is required.

In the system where fine particles of such a small diameter are dispersed, the scattering mode of incident visible light becomes the mode known as Rayleigh scattering or Mie scattering, and the amount of dispersed scattering light in the material is very small. Industrially, the degree of haze is often evaluated by the haze value which is defined as the percentage of the amount of dispersed transmitting light to the amount of total transmitting light, and what contribute to haze are coarse primary particles of ITO with a particle diameter exceeding 70 nm and coagulated secondary particles, and voids in the film or the surface roughness of the film. In the film containing 50 percent or more fine particles with a particle diameter of 50 nm or below, it is not difficult to reduce the haze to 5 percent or below.

Since haze is almost proportional to the film thickness, it is preferred to decrease the thickness of the film in which fine ITO or high-conductivity oxide particles are dispersed as much as possible. For example, in order to decrease haze to 5 percent or below, the film thickness must be 0.60 $\mu$m or less. The lower limit of the film thickness is preferably 0.05 $\mu$m. This is limited because it is difficult to form a uniform film thinner than this by the ink method. According to experiments, if excessively thin film is formed the distribution of conductive particles becomes like islands, and resistance increases sharply and the surface becomes uneven, resulting in increase in haze.

As transparent conductive fine particles, a part of ITO may be replaced by antimony added tin oxide (ATO), aluminum added zinc oxide (AZO), fluorine added indium oxide, fluorine added tin oxide, fluorine added zinc, fluorine added ITO, or fluorine added ATO. All of these material are transparent and conductive, and the addition of fluorine is intended to improve conductivity by increasing the carrier content.

In the ITO dispersed silicate layer, fine particles of a high-conductivity oxide such as ruthenium dioxide, rhenium trioxide, iridium dioxide, rhodium dioxide, ruthenium-based pyrochlore, and iridium-based pyrochlore, may be present in addition to fine ITO particles. Since the improvement of film conductivity by the presence of such a high-conductivity oxide actually brings about hereto- coagulation due to the mixing of different kinds of fine particles in the treating solution, the conductivity of the film is little improved due to the degradation of dispersibility, or rather lowers. This is more significant when more particles are mixed. Since the quantity of fine particles exceeding 25 percent causes the significant degradation of conductivity, it is preferred to limit the quantity of fine particles within 25 percent, preferably between 0.1 and 25% by weight.

In the multilayer structure, fine particles of a high-conductivity oxide may be introduced in the ITO layer, or ITO may be introduced in the high-conductivity oxide particle dispersed layer necessarily during the coating process, instead of using an ink containing both transpatent conductive and high-conductivity oxide fine particles in a single treating solution. What is industrially preferred is the case where an ITO layer is laminated as the lower layer and a high-conductivity oxide particle dispersed layer is laminated as the upper layer. In this case, if the diameter of colloidal particles of a high-conductivity oxide in the treating solution is sufficiently small, they are partially permeated into the underlying ITO dispersed layer, and the ITO layer after heating partially contains fine particles of the high-conductivity oxide. In this case, since fine particles of the high-conductivity oxide are introduced without affecting the dispersing condition of the ITO layer previously formed, the conductivity of the multilayer film after heating is further improved.

The typical examples of fine particles of the high-conductivity oxides used in a high-conductivity oxide dispersed silicate layer constituting the film of the present invention include ruthenium dioxide ($RuO_2$), rhenium trioxide ($ReO_3$), iridium dioxide ($IrO_2$), rhodium dioxide ($Rho_2$), ruthenium-based pyrochlore ($Pb_2Ru_2O_{6.5}$, $Bi_2Ru_2P_{7-x}$) and iridium-based pyrochlore ($Pb_2Ir_2O_{7-x}$, $Bi_2Ir_2O_7$). By dispersing fine particles of these high-conductivity oxides in the film in a high concentration, conductive paths where fine particles contact with each other in the film impart conductivity to the film. The specific resistance of oxides such as ruthenium dioxide, rhenium trioxide, iridium dioxide, rhodium dioxide, ruthenium-based pyrochlore, and iridium-based pyrochlore is in the order from $10^{-3}$ to $10^{-5}$ $\Omega \cdot cm$ and compressed resistance under a pressure of, for example 100 kgf/cm$^2$, is $10^{-1}$ to $10^{-3}$ $\Omega \cdot cm$. For example, fine particles of $RuO_2$ has a compressed resistance of $5 \times 10^{-3}$ $\Omega \cdot cm$ to $2.5 \times 10^{-3}$ $\Omega \cdot cm$ under a pressure between 50 and 200 kgf/cm$^2$. Therefore, the film in which fine particles of these conductive oxides has conductivity equal to or higher than the conductivity of the ITO dispersed silicate film of the same thickness. The film in which fine particles of these high-conductivity oxides may be used alone, or as a double layer film coated by an overcoat film, and further may be used as a component for constituting a multilayer structure.

The solvents for dispersing the above fine particles of a high-conductivity oxide may be solvents having a suitable boiling point below the sintering temperature, and those which efficiently dispersed fine particles of the oxide. These solvents include, for example, N-methyl-2-pyrrolidone (NMP), ethanol, 4-hydroxy-4-methyl-2-pentanone (diacetone alcohol), iso-propyl alcohol, N,N-dimethylformamide (DMF), dimethylacetamide, methyl cellosolve, acetone, and tetrahydroxyfuran as preferred examples.

The high-conductivity oxide dispersed silicate layer may contain a small amount of transparent conductive oxides, such as indium tin oxide, antimony added tin oxide, and aluminum added zinc oxide.

In many cases, fine particles of a high-conductivity oxide in the film are introduced as those dispersed in the ink. For rhenium trioxide ($ReO_3$) only, it is effective to form from the ink constituents during heating after applying the ink by the following method.

An ink consisting of a heptavalent rhenium compound a reducing compound, and an organic solvent, or an ink consisting of the above ink to which a silicate-based binder consisting mainly of a partially hydrolyzed alkyl silicate polymer is added, is applied to the base material, and heated at a temperature of 100° C. or above but 450° C. or below, to form a high-conductivity film in which fine particles of rhenium trioxide are dispersed.

Although preferable examples of heptavalent rhenium compounds are rhenium heptaoxide ($Re_2O_7$), perrhenic acid ($HReO_4$), and ammonium perrhenate ($NH_4ReO_4$), any compound that provides $ReO_4^{-}$ ions in the solution may be used. Oxyrhenates ($MReO_4$, M=Na, K, Ag, Cs, Pb, Tl, Re; and $N(ReO_4)_2$, N=Sr, Mg, Ca, Cu, Zn, Pb), and rhenic chloride ($ReO_3Cl$) may also be used.

Preferred reducing compounds are water and alcohol. By using a solution containing such heptavalent rhenium compounds alone, or an ink consisting of this solution to which ITO dispersed silicate is added, a high-conductivity transparent film may be produced.

Furthermore, by preheating the above ink at a temperature between 100° and 450° C., fine particles of rhenium trioxide may be obtained. These rhenium trioxide particles may be used as well to produce a dispersed film, by the method the same as in the case of ruthenium dioxide.

For the purpose of the present invention, silicates mean compounds formed by polysiloxane bonding, and are obtained by the dehydration condensation polymerization of silanol (SiOH). A part of Si in siloxane bonding may be replaced by Ti, Zr or Al for the adjustment of the index of refraction or mechanical reinforcement. Organic pigments may also be added for the improvement of contrast.

As the method for forming the film of the present invention, a method in which an ink consisting of the above conductive fine particles and a silicate silution dispersed in a suitable solvent is applied to the substrate, and dried. By repeating these steps, a multilayer film is formed. The film is finally sintered at a temperature of 200° C. or below.

Here, the silicate solution constituting the ink is a solution consisting mainly of ortho-alkyl silicate or the partial dehydration condensation polymerization product of hydrolyzed ortho-alkyl silicate. The partial dehydration condensation polymerization product of alkyl silicates include the dehydration condensation polymerization product of ortho-alkyl silicate hydrolyzed by adding water and a catalyst, or a commercially available alkyl silicate solution that has been hydrolyzed and condensation polymerized to tetramer or pentamer, which is further hydrolyzed and dehydration condensation polymerized. Since the viscosity of the solution increases and finally, the solution solidifies when condensation polymerization proceeds, the condensation polymerization is stopped before the solution has a viscosity suitable for applying it to the substrate; however, the degree of condensation polymerization is not limited if the viscosity is in such a level or below. The polymer of partial hydrolyzed alkyl silicate forms hard silicate during sintering after film forming by almost completing the condensation polymerization reaction.

Although the ink is generally applied by spin coating, the method is not limited if the ink is applied to form a flat, uniform, thin film, and spray coating or dip coating may also be used. The sintering temperature is normally 200° C. or below considering the highest temperature of the completed CRT, but higher temperature may be used. Although the surface resistance tends to decrease with inrease in sintering temperatures, the resistance tends to increase when the sintering temperature exceeds about 300° C. because the lost oxygen sites of ITO crystals are refilled by oxygen.

DETAILED DESCRIPTION OF THE PREFERRED EMBODIMENT

EXAMPLE 1

Fifteen grams of ultra fine particles A of ITO from Sumitomo Metal Mining Company shown in Table 1, 20 g of N-methyl-2-pyrrolidone (NMP), 7 g of N,N-dimethylformamide (DMF), and 70 g of 4-hydroxy-4-methyl-2-pehtanone (diacetone alcohol) were mixed, and this solution was mixed in a ball mill using zirconia balls of a diameter of 5 mm for 36 hours to form an ITO dispersion. In a mixed solution of 1.5 g of ethyl silicate 40 from Tama Chemical Industry, 16 g of diacetone alcohol, and 1.5 g of distilled water, a mixed solution of 3 g of 5 percent hydrochloric acid solution, 2 g of diacetone alcohol, and 2.4 g of distilled water was added dropwise stirring, to form an ethyl silicate solution. These two solution were mixed,and spilled down onto a 200×150×3 mm plate glass substrate rotating at 150 rpm.

The rotation of the spin coater was determined to be 150 rpm to be as fast as possible to achieve a centrifugal force sufficient to spread the viscous ink, but not too fast to break the CRT or to damage functions. The surface of the plate glass was washed with acetone and preheated to 50° C., and the same ink was spin-coated on two glass plates. After spin coating, one of the glass plates was dried at 170° C. for 10 minutes, and film thickness and surface resistance were measured.

The other glass plate was rotated on the spin coated at 150 rpm, and the overcoat solution was dropped. The glass plate was heated at 170° C. for 10 minutes to form an ITO dispersed silicate film with overcoat glass. The overcoat solution was previously prepared by mixing 6.5 g of ethyl silicate 40 from Tama Chemical Industry, 80 g of diacetone alcohol, and 7 g of distilled water, to which a mixed solution of 15 g of 5 percent hydrochloric acid solution, 10 g of diacetone alcohol, and 12 g of distilled water was added dropwise stirring to form an ethyl silicate solution. The solution was diluted with ethanol to contain 3 percent ethyl silicate.

After confirming the formation of a transparent film on the surface of the plate glass after drying, the film structure was evaluated. The results of evaluation are shown in Table 2. As the results of measurement of surface resistance and other properties, excellent properties as shown in Table 3 were obtained. The surface resistance of the first layer was $2.62 \times 10^4$ $\Omega/cm^2$, which was much lower than the surface resistance of conventional layers. Although the surface resistance after the second layer increased to $5.41 \times 10^7$ $\Omega/cm^2$, this was because the surface was coated by a silicate film. When electric field shielding treatment is actually performed on TV CRTs, since the electrode for grounding is drawn out of the first layer, the surface resistance of the first layer shown in Table 3 is used as the guideline for the shielding effect. Optical properties were also excellent as the haze value of 0.7 percent and the integral reflection factor of 7.4 percent.

Here, it should be noted that the reflectivity measured using an integration bulb is the reflectivity of 45-degree incident light, and is larger than the normal reflectivity of vertically incident light usually measured. This sample was cut using a low-speed precision cutter, and sliced using a ultra microtome to prepare a specimen for transmission electron microscope (TEM) observation to observe the cross-section of the film. As the result of observation, the percentage volume of ITO fine particles in the first layer was estimated to be 58 percent, among which the percentage volume of ITO fine particles having a particle diameter of 50 nm or less was estimated to be 87 percent indicating distribution in which sufficiently fine particles occupy the major portion.

EXAMPLES 2 and 3

A film of a double layer structure was prepared in the same way as in Example 1 except ITO powder B and c in Table 1 was used. The results of evaluation of electrical and optical properties, as shown in Table 3, showed that the film using powder B had properties superior to the film using powder A, and the film using powder C had properties almost same as the film using powder A.

EXAMPLE 4

Fifteen grams of ultra fine particles B of ITO shown in Table 1, 10 g of N-methyl-2-pyrrolidone (NMP), 3 g of N,N-dimethylformamide (DMF), and, 70 g of 4-hydroxy-4-methyl-2-pentanone (diacetone alcohol) were mixed, and this solution was mixed in a ball mill using zirconia balls of a diameter of 5 mm for 36 hours to form an ITO dispersion. In a mixed solution of 1.5 g of ehtyl silicate 40 from Tama Chemical Industry, 16 g of diacetone alcohol, and 1.5 g of distilled water, a mixed solution of 3 g of 5 percent hydrochloric acid solution, 2 g of diacetone alcohol, and 2.4 g of distilled water was added dropwise stirring, to form an ethyl silicate solution. These two solutions were mixed, and diluted with ethanol to have a solid content (ITO and silicate) of 3.0 percent to form a spraying ink. This ink was sprayed reciprocatively from a spray nozzle on to a 250× 250×3 mm glass plate to form a film, and was dried at 180° C. for 10 minutes. The surfaces of the glass plates were previously washed with acetone, and preheated to 50° C., and the same ink was applied to two glass plates by spray coating.

After spray coating, one of the samples was dried at 180° for 10 minutes, and film thickness and surface resistance were measured. The surface was observed through a scanning electron microscope, and crater-like patterns of several microns were observed throughout the surface. The other glass plate was coated with the overcoat solution same as in Example 1 by spraying, dried at 180° C. for 10 minutes, and various properties were evaluated.

In the TEM observation of the cross-section of the film, the distribution of ITO fine particles was same as in Example 1, and the percentage volume of ITO fine particles of 50 nm or below was 92 percent. Among various properties, optical properties, especially the haze value was slightly degraded, but the surface resistance was in the order of $10^3$ $\Omega/cm^2$. The degradation of the haze value was considered due to increase in the film thickness as well as the slightly uneven interfaces and surfaces of the sprayed film.

EXAMPLE 5

Fifteen grams of ultra fine particles B of ITO shown in Table 1, 20 g of N-methyl-2-pyrrolidone (NMP), 7 g of N,N-dimethylformamide (DMF), and 70 g of diacetone alcohol were mixed, and this solution was mixed in a ball mill using zirconia balls of a diameter of 5 mm for 36 hours to form an ITO dispersion. In a mixed solution of 1.5 g of ethyl silicate 40 from Tama Chemical Industry, 16 g of diacetone alcohol, and 1.5 g of distilled water, a mixed solution of 3 g of 5 percent hydrochloric acid solution, 2 g of diacetone alcohol, and 2.4 g of distilled water was added dropwise stirring, to form an ethyl silicate solution. These two solutions were mixed in a square vessel, and two 100×100×3 mm glass plates were dipped in the mixed solution to form the first layer. The plates were dried at 180° C. for 10 minutes, and one is used for the evaluation of film thickness and surface resistance. The other glass plate was further dipped in an overcoat solution, dried at 180° C. for 10 minutes, and properties were evaluated. In this case, since the both surfaces of the plate glass were coated, total transmission factors and haze values were decreased. Although the film was thick and interference fringes were significant, the resistance was as low as $4.46 \times 10^4$, causing no problems.

In the above examples from 1 to 5, it was found from the structure of the film that the resistance of the film was lower when the percentage volume of ITO was larger and the first layer is thicker, that haze was lower when the percentage volume of particles of 50 nm or smaller was larger, and that the reflection factor was lower when the index of refraction of the first layer was higher and the thickness of the second layer was closer to 97 nm. It was also found that the pencil hardness of the film was as high as 9 H or more, that the appearance of the film did not change after, immersing in boiling water for 15 minutes, and that the film had excellent resistance to high temperature and high humidity.

COMPARATIVE EXAMPLE 1

Fifteen grams of ultra fine particles of tin oxide of an average particle diameter of 8 nm from Sumitomo Metal Mining Co. 140 g of ethanol, 25 g of diacetone alcohol, and 80 g of distilled water were mixed, and this solution was mixed in a ball mill using zirconia balls of a diameter of 5 mm for 36 hours to form an ITO dispersion. In a mixed solution of 1.5 g of ethyl silicate 40 from Tama Chemical Industry, 16 g of diacetone alcohol, and 1.5 g of distilled water, a mixed solution of 3 g of 5 percent hydrochloric acid solution, 2 g of diacetone alcohol, and 2.4 g of distilled water was added dropwise stirring, to form an ethyl silicate solution. These two solution were mixed, and a film was formed by spin coating as in Example 1, and dried at 180° C. for 10 minutes.

When the properties of this film were measured, optical properties were satisfactory, but the resistance was as high as $7.09 \times 10^7$ $\Omega/cm^2$. Furthermore, although the solvent composition was changed to improve the dispersion of tin oxide fine particles, the resistance did not lower from the order of $10^7$ $\Omega/cm^2$, and was not suitable for electric field shielding. Furthermore, although an overcoat film was formed as in Example 1, the resistance further increased.

COMPARATIVE EXAMPLE 2

A sprayed film was formed in the same way as in Example 4 except that the number of spraying was 10 for both the first and second layers. Although the first layer of this film was as thick as 0.71 $\mu$m, and the resistance was as low as $1.79 \times 10^3$, optical properties were not satisfactory as the haze value exceeded 16 percent.

COMPARATIVE EXAMPLE 3

In Example 1, NMP was replaced by the same amount of water as a constituent of the ITO dispersion, and the film was formed, dried and evaluated in the same way. In this film, the dispersion of ITO fine particles in the first layer was poor, and tended to coagulate. The percentage volume of ITO was as low as 34 percent, the resistance of the first layer wss as high as $3.72 \times 10^6$, and haze and reflectivity were high.

COMPARATIVE EXAMPLE 4

A transparent film of a double layer structure was formed on a glass plate in the same way as in Example 1 except that ITO powder D shown in Table 1 from Sumitomo Metal Mining Co. of a large average particle diameter. The result of the observation of the sample sliced in the cross-sectional direction showed that the percentage volume of ITO particles of 50 nm or smaller was 30 percent or less, and coarse ITO particles of 70–80 nm occupied the majority of the volume. As Table 3 shows, the surface resistance of this film was $1.20 \times 10^5$ $\Omega/cm^2$, which was too high to use for electric field shielding, and the haze value was as high as 4.7 percent.

The average particle diameter of powder used in this embodiment was the average measured from transmission electron micrographs in five different fields of view. Observation through a transmission electron microscope was performed using JEM-2000EX of Nihon Denshi at an acceleration voltage of 200 kv. The thickness and the index of refraction of the formed film were measured using an ellipsometer manufactured by Mizojiri Kogaku Kogyo. The film thickness was also measured using a needle-type surface roughness meter, and almost the same results were obtained. By using an ellipsometer, the thickness of the first and second layers are non-destructively obtained in average for the 2–3 mm region where laser probe is irradiated. The surface resistance was measured using a surface resistance meter MCP-T200 manufactured by Mitsubishi Petrochemicals. Haze values, total transmission, and integral reflection factor were measured using a haze meter HR-200 manufactured by Murakami Shikisai Gijutsu Kenkyusho. Pencil hardness was measured using a pencil hardness tester manufactured by Toyo Seiki under a load of 1 kg.

TABLE 1

|  | Specific surface area (m$^2$/g) | Average particle diameter (nm) |
|---|---|---|
| ITO powder A | 27.5 | 25.3 |
| ITO powder B | 28.6 | 19.0 |
| ITO powder C | 21.1 | 38.9 |
| ITO powder D | 12.1 | 77.4 |

TABLE 2

Results of film structure evaluation

| Sample No. | Coating method | First layer thick. ($\mu$m) | Second layer thick. ($\mu$m) | ITO volume (%) | Volume of 50 nm or below (%) | First layer ref. index | Second layer ref. index |
|---|---|---|---|---|---|---|---|
| Ex. 1 | Spin | 0.13 | 0.21 | 58 | 87 | 1.68 | 1.41 |
| Ex. 2 | Spin | 0.16 | 0.12 | 75 | 94 | 1.74 | 1.42 |
| Ex. 3 | Spin | 0.09 | 0.10 | 60 | 78 | 1.68 | 1.42 |
| Ex. 4 | Spin | 0.26 | 0.27 | 53 | 92 | 1.60 | 1.40 |
| Ex. 5 | Spin | 0.10 | 0.15 | 75 | 89 | 1.71 | 1.42 |
| Comp. ex. 1 | Dip | 0.12 | 0.14 | *72 | *100 | 1.60 | 1.42 |
| Comp. ex. 2 | Spray | 0.71 | 0.35 | 67 | 85 | 1.65 | 1.41 |
| Comp. ex. 3 | Spin | 0.13 | 0.11 | 34 | 96 | 1.57 | 1.42 |
| Comp. ex. 4 | Spin | 0.12 | 0.08 | 66 | 30 | 1.71 | 1.43 |

*Tin oxide

TABLE 3

Results of film properties evaluation

| Sample No. | First layer surface resist. (Ω/□) | Second layer surface resist. (Ω/□) | Total transmission (%) | Haze value (%) | 550 nm refkectivity | Pencil hardness | Boiling water immers. (15 min) |
|---|---|---|---|---|---|---|---|
| Ex. 1 | $2.62 \times 10^4$ | $5.41 \times 10^7$ | 98.6 | 0.7 | 7.4 | 9H | No change |
| Ex. 2 | $4.11 \times 10^3$ | $7.22 \times 10^4$ | 99.0 | 0.6 | 6.9 | 9H | No change |
| Ex. 3 | $1.19 \times 10^4$ | $6.56 \times 10^5$ | 99.1 | 1.2 | 6.6 | 9H | No change |
| Ex. 4 | $6.50 \times 10^3$ | $8.92 \times 10^4$ | 98.8 | 2.8 | 8.3 | 9H | No change |
| Ex. 5 | $4.46 \times 10^4$ | $9.20 \times 10^5$ | *93.2 | *3.5 | 7.1 | 9H | No change |
| Comp. ex. 1 | $7.09 \times 10^7$ | $1.23 \times 10^9$ | 99.7 | 0.4 | 7.8 | 9H | No change |
| Comp. ex. 2 | $1.79 \times 10^3$ | $3.06 \times 10^8$ | 95.4 | 16.5 | 11.5 | 9H | No change |
| Comp. ex. 3 | $3.72 \times 10^6$ | $5.11 \times 10^6$ | 99.1 | 5.7 | 8.4 | 9H | No change |
| Comp. ex. 4 | $1.20 \times 10^5$ | $9.83 \times 10^5$ | 98.8 | 4.7 | 6.3 | 9H | No change |

*Both surfaces

EXAMPLE 6

To an ReO$_3$ dispersion prepared by mixing 15 g of ultra fine powder of ReO$_3$ (average particle diameter 35 nm, Sumitomo Metal Mining Co.), 20 g of N-methyl-2-pyrrolidone (NMP), and 65 g of 4-hydroxy-4-methyl-2-pentanone (diacetone alcohol) in a ball mill, and an ITO dispersion prepared by mixing 15 g of ultra fine powder of ITO (average particle diameter 20 nm, Sumitomo Metal Industries), 20 g of NMP, and 65 g of diacetone alcohol in a ball mill, 50 g of an ethyl silicate solution prepared by mixing 50 g of ethyl silicate (Tama Chemical), 34 g of ethanol, 8 g of 5 percent hydrochloric acid solution, and 5 g of distilled water, and 500 g of ethanol were mixed to form 650 g each of an ITO silicate ink and an ReO$_3$ silicate ink.

Next, 10 g of the ReO$_3$ silicate ink was dropped from a beaker on to a 200×150×3 mm plate glass substrate rotated at 150 rpm, and allowed to stand for 10 minutes. Then, 10 g of the ITO silicate ink was similarly dropped from a beaker, and allowed to stand for 10 minutes. Further, 10 g of a silicate ink was similarly dropped from a beaker, and allowed to stand for 1 minute, and rotation was stopped. The plate glass thus spin-coated by three layers was heated in the air at 180° C. for one hour to form a three-layer laminated film.

EXAMPLE 7

A three-layer laminated film was formed in the same way as in Example 6 except that fine particles of RuO$_2$ (average particle diameter 35 mm, Sumitomo Metal Mining Co.) in place of ReO$_3$ as the high-conductivity oxide silicate layer.

EXAMPLE 8

A three-layer laminated film was formed in the same way as in Example 6 except that the order of film formation of the ITO dispersed silicate layer and the ReO$_3$ dispersed silicate layer was reversed.

EXAMPLE 9

In the same way as in Example 6, an ITO silicate ink, an ReO$_3$ silicate ink, and a silicate ink were prepared. On a 200×150×3 mm plate glass substrate rotating at 150 rpm, 10 g of the ITO silicate ink was dropped, and the substrate was allowed to rotate for 10 minutes. Similarly, 10 g of the silicate ink was dropped on the substrate, and allowed to rotate for 5 minutes, then 10 g of the ReO$_3$ silicate ink was dropped on the substrate, and allowed to rotate for 10 minutes, further, 10 g of the silicate ink was dropped on the substrate, and allowed to rotate for 1 minute, then rotation was stopped. The plate glass thus subjected to spin coating of four layers was heated in the air at 180 20 C. for 1 hour to form a four-layer laminated film.

EXAMPLE 10

A three-layer laminated film was formed in the same way as in Example 7 except that the heating temperature was 250° C.

EXAMPLE 11

A three-layer laminated film was formed in the same way as in Example 9 except that the heating temperature was 250 20 C.

EXAMPLE 12

A three-layer laminated film was formed in the same way as in Example 6 except that an RuO$_2$ dispersion containing ultra fine particles of RuO$_2$ of an average particle diameter of 12 mm was used in place of the ReO$_3$ dispersion.

COMPARATIVE EXAMPLE 5

In the same way as in Example 6, an ITO silicate ink and a silicate ink were prepared. On a 200×150×3 mm plate glass substrate rotating at 180 rpm, 10 g of the ITO silicate ink was dropped, and the substrate was allowed to rotate for 10 minutes. Similarly, 10 g of the silicate ink was dropped on the substrate, and allowed to rotate for 1 minute, then rotation was stopped. The plate glass subjected to spin coating of two layers formed in the same way as in Example 1 except for the formation of an ReO$_3$ layer was sintered in the air at 180° C. for 1 hour to form a two-layer laminated film.

COMPARATIVE EXAMPLE 6

A two-layer laminated film was formed in the same way as in Example 6 except that the topmost overcoat silicate layer was not formed.

The results of measurement of surface resistance, haze value, film thickness, minimum reflectivity, and pencil hardness of films obtained in Examples 6–11 and Comparative Examples 5 and 6 are collectively shown in Table 4.

The surface resistance of the films was measured using a surface resistance meter, Loweresta MCP-T200 manufactured by Mitsubishi Petrochemical. The haze value was measured using a haze meter HR-200 manufactured by Murakami Shikisai Gijutsu Kenkyusho. The total film thickness was measured using a surface roughness meter, SURFCOM-750A manufactured by Tokyo Seimitsu, for two portions of the film scraped from the substrate. The reflectivity was measured using a spectrophotometer manufactured by Shimadzu Seisakusho. The pencil hardness was measured using a pencil hardness tester manufactured by Toyo Seiki under a load of 1 kg, and evaluated visually from scratches.

The results of Table 4 show that the three-layer laminated films of Examples 6–8 have a surface resistance of $0.8$–$4.3 \times 10^3$ $\Omega/cm^2$, which is sufficiently low for the electric field shielding effect, and haze value and minimum reflectivity factor are also low. The four-layer laminated film of Example 9 had a significantly low surface resistance of $6.3 \times 10^3$ $\Omega/cm^2$, the haze value was as low as 0.3 percent, and the minimum reflectivity was significantly lowered to 0.4 percent. Furthermore, three-layer laminated films of Examples 10 and 11 had the lowest surface resistance of $6 \times 10^2$ $\Omega/cm^2$ and $5 \times 10^2$ $\Omega/cm^2$, respectively. The film using ultra fine $RuO_2$ of Example 12 had a surface resistance as low as $5 \times 10^2$ $\Omega/cm^2$. In this case, the TEM observation of the slice of the film showed the permeation of fine $RuO_2$ particles in the ITO layer.

In the case of the two-layer laminated film of Comparative Example 5, on the other hand, the surface resistance was more than ten times higher than the surface resistance of the film containing an $ReO_3$ silicate layer. In the case of the two-layer laminated film of Comparative Example 6, although the surface resistance was low, the haze value increased, and the pencil hardness was as low as 2 H compared with 7–9 H for other examples. Since this film was not designed to be low reflection, the minimum reflectivity could not determined.

EXAMPLE 13

An $RuO_2$ dispersion was prepared by mixing 15 g of ultra fine powder of $RuO_2$ (average particle diameter 35 nm, Sumitomo Metal Mining Co.), 15 g of N-methyl-2-pyrrolidone (NMP), 7 g of N,N-dimethylformamide (DMF), and 75 g of ethanol. Separately, an ethyl silicate solution was prepared by mixing 1.5 g of ethyl silicate 40 having an average polymerization degree of 4 to 5 from Tama Chemical, 16 g of 4-hydroxy-4-methyl-2-pentanone (diacetone alcohol), and 1.5 g of distilled water, and adding dropwise a mixed solution of 3 g of 5-percent hydrochloric acid solution, 2 g of diacetone alcohol, and 2.4 g of distilled water stirring the first solution. This ethyl silicate solution and the above $RuO_2$ dispersion were mixed, and dropped from a beaker on to a 200×150×3 mm plate glass substrate rotated at 150 rpm. Three plate glass substrates were similarly spin-coated, and heated in the air at a temperature of 180° C. for 30 minutes.

EXAMPLE 14

A film was formed in the same way as in Example 13 except that the heating was performed at 450° C. for 30 minutes, and the properties were evaluated.

EXAMPLE 15

A film was formed in the same way as in Example 13 except that ultra fine powder of $IrO_2$ of an average particle diameter of 21 nm was used as conductive powder, and the properties were evaluated.

EXAMPLE 16

A film was formed in the same way as in Example 13 except that ultra fine powder of $RhO_2$ of an average particle diameter of 35 nm was used as conductive powder, and the properties were evaluated.

TABLE 4

| Sample No. | Number of layers | *Film composition | Sintering temperature (°C.) | Surface resistance (×$10^3$ $\Omega/\square$) | Film thickness ($\mu$m) | Haze value (%) | minimum reflectivity (%) | Pencil hardness |
|---|---|---|---|---|---|---|---|---|
| Ex. 6 | three layers | SUB-REN-ITO-OC | 180 | 1.5 | 0.34 | 1.4 | 1.8 | 8H |
| Ex. 7 | three layers | SUB-RUT-ITO-OC | 180 | 4.3 | 0.41 | 2.6 | 2.5 | 7H |
| Ex. 8 | three layers | SUB-ITO-REN-OC | 180 | 0.8 | 0.37 | 0.9 | 1.6 | 8H |
| Ex. 9 | four layers | SUB-ITO-SIL-REN-OC | 180 | 6.3 | 0.46 | 0.4 | 0.4 | 9H |
| Ex. 10 | three layers | SUB-RUT-ITO-OC | 250 | 0.6 | 0.32 | 0.6 | 1.2 | 9H |
| Ex. 11 | three layers | SUB-ITO-REN-OC | 250 | 0.5 | 0.33 | 0.3 | 1.0 | 9H |
| Ex. 12 | three layers | SUB-ITO-RUT-OC | 180 | 0.5 | 0.29 | 0.8 | 1.0 | 9H |
| Com. ex. 5 | two layers | SUB-ITO-OC | 180 | 72 | 0.23 | 0.5 | 0.9 | 8H |
| Com. ex. 6 | two layers | SUB-REM-ITO | 180 | 1.1 | 0.27 | 2.4 | — | 2H |

*Film composition
SUB: plate glass substrate
ITO: ITO dispersed silicate layer
REN: $ReO_3$ dispersed silicate layer
RUT: $RuO_2$ dispersed silicate layer
SIL: silicate layer
OC: overcoat silicate layer

EXAMPLE 17

A film was formed in the same way as in Example 13 except that ultra fine powder of $Pb_2Ru_2O_{7-x}$ of an average particle diameter of 42 nm was used as conductive powder and heated at 500° C. for 30 minutes, and the properties were evaluated.

EXAMPLE 18

A film was formed in the same way as in Example 13 except that ultra fine powder of $Bi_2IrO_7$ of an average particle diameter of 32 nm was used as conductive powder and sintered at 300° C. for 30 minutes, and the properties were evaluated.

EXAMPLE 19

A film was formed in the same way as in Example 13 except that ultra fine powder of $RhO_2$ of an average particle diameter of 35 nm and ultra fine powder of ITO (ITO-UFP) of Sumitomo Metal Mining Co. of an average particle diameter of 25 nm were used in a volume ratio of 1:1 as conductive powder, and the properties were evaluated.

EXAMPLE 20

A film was formed in the same way as in Example 13 except that ultra fine powder of $RhO_2$ of an average particle diameter of 35 nm and ultra fine powder of ITO (ITO-UFP) of Sumitomo Metal Mining Co. of an average particle diameter of 25 nm were used in a volume ratio of 1:1 as conductive powder, heated at 300° C. for 30 minutes, and the properties were evaluated.

EXAMPLE 21

A film was formed in the same way as in Example 13 except that ultra fine powder of $IrO_2$ of an average particle diameter of 21 nm and ultra fine powder of ATO of an average particle diameter of 12 nm were used in a volume ratio of 1:1 as conductive powder, and the properties were evaluated.

EXAMPLE 22

A film was formed in the same way as in Example 13 except that ultra fine powder of $RuO_2$ of an average particle diameter of 35 nm and ultra fine powder of AZO of an average particle diameter of 40 nm were used in a volume ratio of 1:1 as conductive powder, and the properties were evaluated.

COMPARATIVE EXAMPLE 7

A film was formed in the same way as in Example 13 except that ultra fine powder of ITO (ITO-UFP) of Sumitomo Metal Mining Co. of an average particle diameter of 25 nm was used as conductive powder, and the properties were evaluated.

COMPARATIVE EXAMPLE 8

A film was formed in the same way as in Example 13 except that ultra fine powder of ATO of an average particle diameter of 12 nm was used as conductive powder, and the properties were evaluated.

COMPARATIVE EXAMPLE 9

A film was formed in the same way as in Example 13 except that high-conductivity carbon powder of an average particle diameter of 8 nm was used as conductive powder, and the properties were evaluated.

COMPARATIVE EXAMPLE 10

A film was formed in the same way as in Example 13 except that dropping from the beaker was performed three times between which the dispersion was dried for 10 minutes intending the formation of a thick film, and the properties were evaluated.

The results of measurement of surface resistance, haze value, film thickness, and transmission of films obtained in Examples 14–22 and Comparative Examples 7–10 are collectively shown in Table 5.

As the results in Table 5 show, according to the present invention, a conductive film with the haze value not worse than the haze values of Comparative Example 7 using ITO powder and Comparative Example 8 using ATO powder, and with a surface resistance between $10^3$ and $10^5$ $\Omega/cm^2$ is formed. For transmission, an adequate value of 64–88 percent between Comparative Examples 7 and 8, and Comparative Examples 9 and 10 using carbon and $RuO_2$, respectively. It is found that as each Example shows, the transmission of the conductive film may be adjusted by controlling the selection of conductive particles, film thickness, and heating temperature.

TABLE 5

| Sample No. | Powder used | Sintering temperature (°C.) | Surface resistance ($\Omega/\square$) | Film thickness ($\mu m$) | Transmission (%) | Haze value (%) |
|---|---|---|---|---|---|---|
| Ex. 12 | $Ru\ O_2$ | 180 | 2200 | 0.19 | 72 | 3.0 |
| Ex. 13 | $Ru\ O_2$ | 450 | 1480 | 0.16 | 75 | 4.6 |
| Ex. 14 | $Ir\ O_2$ | 180 | 2450 | 0.22 | 79 | 4.8 |
| Ex. 15 | $Rh\ O_2$ | 180 | 4910 | 0.23 | 64 | 2.4 |
| Ex. 16 | $Pb_2\ Ru_2\ O_{7-x}$ | 500 | 4850 | 0.17 | 76 | 5.0 |
| Ex. 17 | $Bi_2\ Ir_2\ O_7$ | 300 | 7830 | 0.17 | 78 | 4.5 |
| Ex. 18 | $Ru\ O_2$ + ITO | 180 | 11400 | 0.14 | 88 | 4.4 |
| Ex. 19 | $Ru\ O_2$ + ITO | 300 | 4740 | 0.14 | 86 | 5.0 |
| Ex. 20 | $Ir\ O_2$ ATO | 180 | 3960 | 0.25 | 84 | 2.1 |
| Ex. 21 | $Ru\ O_2$ + AZO | 180 | 3300 | 0.21 | 80 | 3.7 |
| Com. ex. 7 | ITO | 180 | 6600 | 0.24 | 99 | 2.8 |
| Com. ex. 8 | ATO | 180 | $1.6 \times 10^8$ | 0.15 | 99 | 1.6 |
| Com. ex. 9 | Carbon | 180 | $5.6 \times 19^8$ | 0.25 | 64 | 18.6 |
| Com. ex. 10 | $Ru\ O_2$ | 180 | 1050 | 0.82 | 67 | 35.6 |

EXAMPLE 23

To 20 g of an aqueous solution of perrhenic acid, 85 g of methyl alcohol (MeOH) was added as a compound to reduce heptavalent rhenium compounds. To this solution, ethyl silicate adjusted to have an average polymerization degree of 4–5 as a polymer of partially hydrolyzed alkyl silicate was added to have a concentration of 1 percent by weight calculated as $SiO_2$ to the total weight of this mixed solution. The concentration of rhenium compounds calculated as $ReO_3$ relative to the weight of $SiO_2$ was made to be 90:10. On a 200×200×3 mm soda lime-based plate glass substrate rotating at 150 rpm, 15 g of this solution was dropped from a beaker, the substrate was allowed to rotate for 3 minutes, and rotation was stopped. This was heated in an electric furnace of a temperature of 200° C. for 30 minutes to form a film.

When this film was analyzed using X-ray diffraction equipment with a thin film goniometer, it was found that the diffraction patterns from $ReO_3$ (cubic) and $H_{0.15}ReO_3$ are mainly identified, and other diffraction patterns from $ReO_2$ (hexagonal). $NaReO_4$, $ReO_{1.04}(OH)_{1.30}$ and the like were also observed.

EXAMPLE 24

A film was formed under the same conditions as in Example 23 except that diacetone alcohol was used as the compound to reduce heptavalent rhenium compounds.

EXAMPLE 25

A film was formed under the same conditions as in Example 24 except that the weight ratio of $ReO_3$ and $SiO_2$ was 95:5.

EXAMPLE 26

A film was formed under the same conditions as in Example 23 except that $H_2O$ was used as the compound to reduce heptavalent rhenium compounds, and the weight ratio of $ReO_3$ and $SiO_2$ was 85:15.

EXAMPLE 27

A film was formed under the same conditions as in Example 23 except that the rhenium compound was $Re_2O_7$.

EXAMPLE 28

A film was formed under the same conditions as in Example 23 except that the sintering temperature was 100° C.

EXAMPLE 29

Fifty-two grams of an ethyl silicate solution in which hydrolysis and polymerization had been proceeded was prepared by adding 15 g of ethanol and 8 g of 5-percent hydrochloric acid solution to a mixed solution of 4 g of ethyl silicate having an average polymerization degree of 4–5, 5 g of distilled water, and 20 g of ethanol. This silicate solution containing no rhenium component was used as the overcoat solution.

Next, 15 g of the solution prepared under the same conditions as in Example 24 except that the weight ratio of $ReO_3$ and $SiO_2$ was 100:0 was dropped on a plate glass substrate rotating at 150 rpm, and the substrate was allowed to rotate for 3 minutes. Then, 15 g of the overcoat solution was dropped on the rotating substrate, and the substrate was allowed to rotate for 1 minute, and rotation was stopped. The glass substrate was heated in an electric furnace of 200° C. for 30 minutes to form a film consisting of two layers of a conductive layer and an overcoat layer.

EXAMPLE 30

A film was formed under the same conditions as in Example 29 except that the weight ratio of $ReO_3$ and $SiO_2$ was 90:10, and DAA was used as the compound to reduce heptavalent rhenium compounds.

EXAMPLE 31

A film was formed under the same conditions as in Example 24 except that the heating temperature was 450° C.

EXAMPLE 32

A film was formed under the same conditions as in Example 30 except that the rhenium compound was $NH_3ReO_4$.

EXAMPLE 33

A film was formed under the same conditions as in Example 24 except that the rhenium compound was $Re_2O_7$, and DAA was used as the compound to reduce heptavalent rhenium compounds.

COMPARATIVE EXAMPLE 11

A film was formed under the same conditions as in Example 24 except that the heating temperature was 500° C.

COMPARATIVE EXAMPLE 12

Fourteen grams of ultra fine powder of ITO (average particle diameter 20 nm, Sumitomo Metal Mining Co.), 20 g of NMP, and 50 g of DAA were mixed in a ball mill using zirconia balls of a diameter of 5 mm for 172 hours to form 84 g of an ITO dispersion. Separately, 52 g of an ethyl silicate solution in which hydrolysis and polymerization had been proceeded was prepared by adding 15 g of ethanol and 8 g of 6-percent hydrochloric acid solution to a mixed solution of 4 g of ethyl silicate having an average polymerization degree of 4–5, 5 g of distilled water, and 20 g of ethanol. Next, these ITO dispersion and ethyl silicate solution were mixed to form 137 g of a treatment solution for forming conductive films. On a 200×200×3 mm soda lime-based plate glass substrate rotating at 150 rpm, 15 g of this solution was dropped from a beaker, the substrate was allowed to rotate for 3 minutes, and rotation was stopped. This was heated in an electric furnace of a temperature of 200° C. for 30 minutes to form a film.

The surface resistance values of films of Examples 23–33 and Comparative Examples 11 and 12 are collectively shown in Table 6.

It was seen from the results of Table 6 that the conductive film formed using the treatment solution for forming conductive films in which a rhenium compound was dissolved has surface resistance up to 10,000 times lower compared with the film formed by the ink method. It is obvious that the film formed using the above treatment solution has the effect to achieve a high conductivity necessary for electric field shielding. The effect of the invention was achieved at a heating temperature of 200° C. suitable for forming the film on the completed CRT.

TABLE 6

| Sample No. | Rhenium compound or material fine particles | Reducing agent | ReO$_3$:SiO$_2$ weight ratio | Presence/ absence of overcoat | Sintering temperature (°C.) | Surface resistance (Ω/□) |
|---|---|---|---|---|---|---|
| Ex. 22 | HReO$_4$ | MeOH | 90:10 | Absent | 200 | 1.26E + 3 |
| Ex. 23 | " | DAA | " | " | " | 4.91E + 2 |
| Ex. 24 | " | " | 95:5 | " | " | 2.82E + 2 |
| Ex. 25 | " | H$_2$O | 85:15 | " | " | 8.28E + 4 |
| Ex. 26 | Re$_2$O$_7$ | MeOH | 90:10 | " | " | 9.82E + 2 |
| Ex. 27 | " | " | " | " | 100 | 1.07E + 3 |
| Ex. 28 | HReO$_4$ | DAA | 100:0 | Present | 200 | 7.20E + 2 |
| Ex. 29 | " | MeOH | 90:10 | " | " | 2.43E + 3 |
| Ex. 30 | " | DAA | " | Absent | 450 | 3.25E + 4 |
| Ex. 31 | NH$_3$HReO$_4$ | MeOH | " | Present | 200 | 8.46E + 3 |
| Ex. 32 | Re$_2$O$_7$ | DAA | " | " | " | 5.01E + 2 |
| Com. ex. 11 | HReO$_4$ | " | " | Absent | 500 | 8.82E + 6 |
| Com. ex. 12 | (ITO) | — | — | " | 200 | 8.52E + 5 |

As described above, the present invention has the following advantages:

(1) By forming a two-layer film consisting of a thin ITO dispersed silicate film and an overcoat layer of said silicate, a conductive film having a low resistance sufficient for the electric field shielding effect.

(2) By introducing a silicate layer in which highly conductive ReO$_3$ or RuO$_2$ particles are dispersed in parallel to the ITO silicate layer, the conductivity of the film is significantly improved without degrading optical properties such as the haze value and reflectivity.

(3) Conductivity sufficient for the electric field shielding effect is achieved even at the heating temperature of 200° C. or below, and by elevating the heating temperature to a temperature of 300° C. or below, a higher conductivity is expected.

(4) By forming a multilayer film of the present invention on the front glass of a CRT, a low surface resistance required for the electric field shielding effect is achieved at low costs and by low-temperature heating.

(5) By forming a film containing fine particles of a high-conductivity oxide dispersed in a silicate matrix on a glass substrate, a conductive film satisfying transparency and low haze.

(6) The film formed according to the present invention is suitable as an electric field shielding film which can adjust brightness.

(7) The film excels in mechanical strength and weather resistance, and has the effect to reduce surface reflecting light.

(8) Since large and expensive equipment is not required as sputtering and evaporation, manufacturing costs may be reduced.

(9) The film has no adverse effect on visibility, such as the haze of the film, which is a problem in the film formed using a fine particle dispersed ink.

(10) The film having a higher conductivity than the conductivity of conductive films using ITO or ATO is obtained even at a sintering temperature as low as about 100° C.

What is claimed is:

1. A combination of a glass substrate and a transparent conductive film for electric field shielding formed on said glass substrate, said transparent conductive film comprising a first layer of an ITO dispersed silicate containing between 0.1 and 25% by weight of fine particles of a high-conductivity oxide selected from the group consisting of ruthenium oxide and ruthenium pyrochlore, and a second layer of transparent silicate glass, said first layer being located between said glass substrate and said second layer.

2. A combination according to claim 1, wherein said ITO dispersed silicate layer comprises ITO particles, particles of said high-conductivity oxide, and a silicate glass matrix, said ITO particles comprising 50 percent by volume or more particles having a particle diameter of 50 nm or smaller, and the percentage volume of ITO particles is 35–76 percent of the volume of the film.

3. A combination according to claim 2, wherein said ITO dispersed silicate layer is formed by laminating a first sublayer on said glass substrate, said first sublayer comprising ITO particles and fine particles of said high-conductivity oxide, and then laminating a second sublayer on said first sublayer, said second sublayer comprising silicate glass matrix.

4. A combination according to claim 2, wherein said film includes fine particles of rhenium trioxide formed in the film by reduction of a heptavalent rhenium compound.

5. A combination of a glass substrate and a transparent conductive film for electric field shielding on said glass substrate, said transparent conductive film comprising three layers formed over said glass substrate, wherein a first layer consists of an ITO dispersed silicate layer containing between 0.1 and 25% by weight of fine particles of a high-conductivity oxide selected from the group consisting of ruthenium oxide and ruthenium pyrochlore, a second layer is a high-conductivity oxide-dispersed silicate layer, and a third layer is an outermost layer.

6. A combination according to claim 5, wherein said high-conductivity oxide-dispersed silicate layer consists essentially of (B)+(C) or (B)+(C)+(D), (B) being silicate glass matrix, (C) being fine particles of said high-conductivity oxide, and (D) being fine particles of a transparent conductive oxide.

7. A combination according to claim 5, wherein said ITO dispersed silicate layer ITO particles, particles of said high-conductivity oxide, and a silicate glass matrix, said ITO particles comprising 50 percent by volume or more particles having a particle diameter of 50 nm or smaller, and the percentage volume of ITO particles is 35–76 percent of the volume of the film.

8. A combination according to claim 7, wherein said ITO dispersed silicate layer is formed by laminating a first sublayer on said glass substrate, said first sublayer comprising ITO particles and fine particles of said high-conductivity oxide, and then laminating a second sublayer on said first sublayer, said second sublayer comprising silicate glass matrix.

9. A combination according to claim 7, wherein said film includes fine particles of rhenium trioxide formed in the film by reduction of a heptavalent rhenium compound.

* * * * *